Aug. 31, 1926.　　　　　　　　　　　　　　1,598,076
J. GALLEAZZI
NUT CRACKING MACHINE
Filed April 16, 1923　　2 Sheets-Sheet 1

INVENTOR
J. GALLEAZZI
BY
ATT'YS.

Aug. 31, 1926. 1,598,076
J. GALLEAZZI
NUT CRACKING MACHINE
Filed April 16, 1923   2 Sheets-Sheet 2
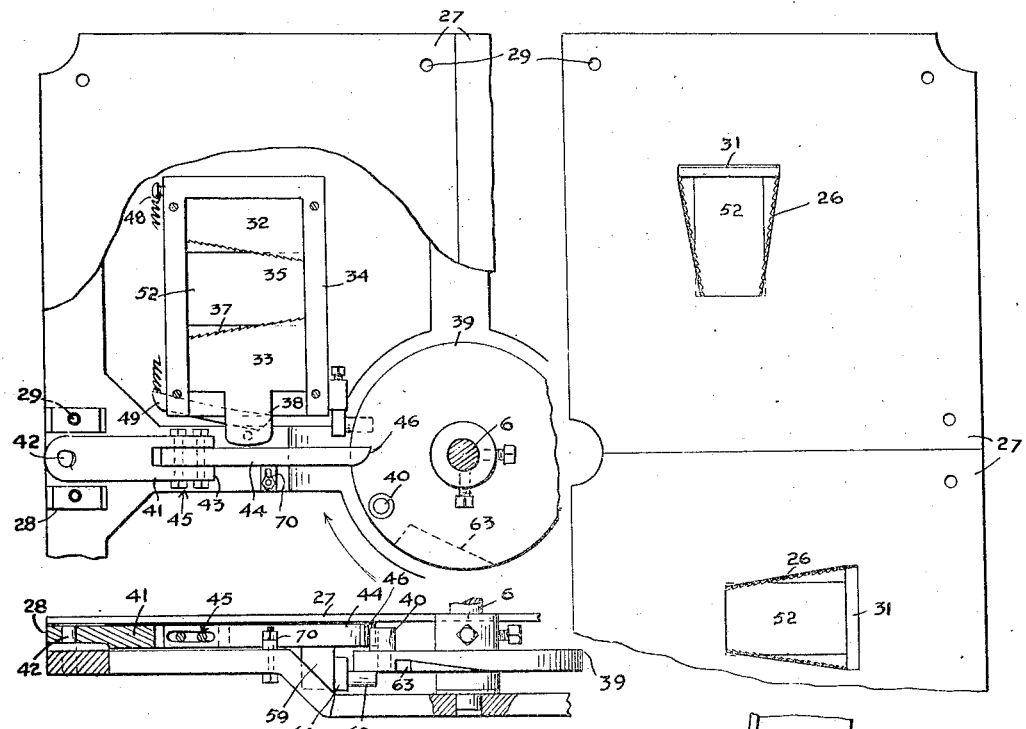
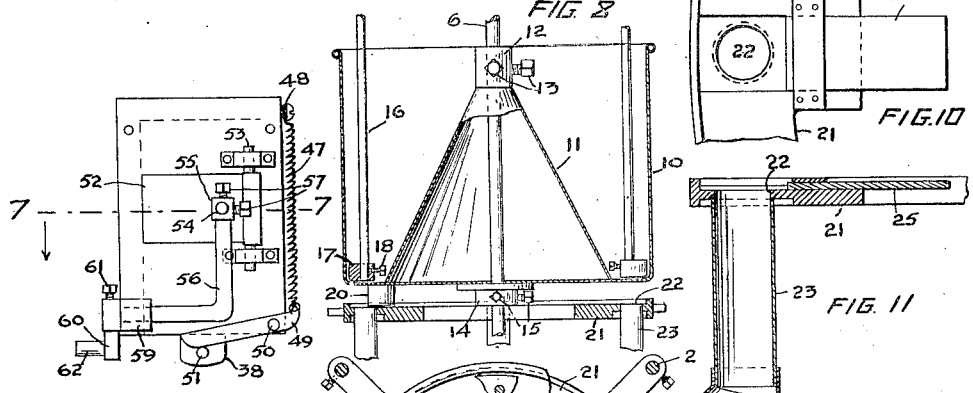
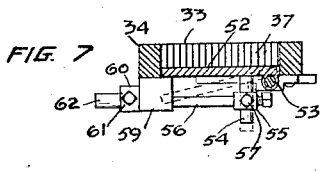
INVENTOR
J. GALLEAZZI
BY
ATT'YS.

Patented Aug. 31, 1926.

1,598,076

UNITED STATES PATENT OFFICE.

JOSEPH GALLEAZZI, OF SAN FRANCISCO, CALIFORNIA.

NUT-CRACKING MACHINE.

Application filed April 16, 1923. Serial No. 632,312.

The present invention relates to improvements in machines fr cracking nuts and resides in the provision of a machine of this character which is simple as to construction and capable of being operated to effectively crack large quantities of nuts at considerably less cost as compared to cracking by hand.

An object of the invention is to provide novel means for distributing the nuts to cracking mechanism which means provides for an expeditious cracking of a large quantity of nuts without danger of damaging the apparatus.

The invention further resides in the novel construction, inter-relation and relative arrangement of specially constructed parts and elements which provide a nut cracking machine which will be superior in point of construction, reliability and inexpensiveness of operation and adaptability for cracking various kinds of nuts and in respect of its capacity for cracking large quantities of nuts without damaging the meat.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

Referring to the drawings:—

Fig. 3 represents an enlarged fragmentary view of the mechanism shown in Fig. 2.

Fig. 4 represents a plan view of the nut holding and cracking jaws showing a part of the mechanism for operating the same.

Fig. 5 is a sectional view partly in elevation of the means for operating the nut cracking jaw.

Fig. 6 is a bottom plan view of the means for holding the nuts and releasing them after they are cracked.

Fig. 7 is a sectional view on the line 7—7 of Fig. 6.

Fig. 8 is a vertical sectional view partly in elevation of the distributer for the feeder.

Fig. 9 is a top plan view being broken away in part, of the mechanism shown in Fig. 8.

Fig. 10 is a fragmentary top plan view of a detail of the distributer.

Fig. 11 is a sectional view of the structure shown in Fig. 10.

Figure 1:
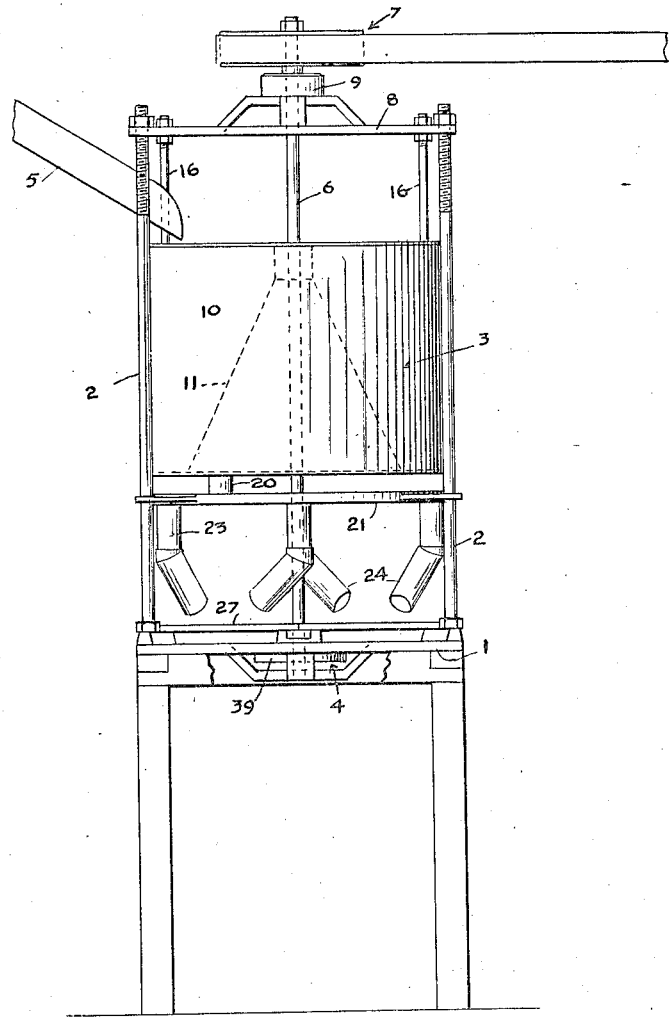
Fig. 1 represents a front elevation of a nut cracking machine constructed in accordance with my invention.
Figure 2:
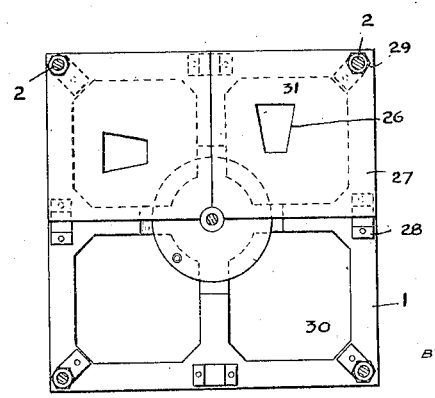
Fig. 2 represents a plan view of the means for holding the nut in position to be cracked, only part of which means is shown.

The embodiment shown in the accompanying drawings includes a table 1 extending upwardly from which are four standards 2 adapted to support distributer or feeder mechanism 3. Nut cracking mechanism generally designated 4 is supported on the table 1 beneath the distributer. The feed chute 5 is arranged to deliver the nuts into the distributer 3. The mechanisms 3 and 4 are operated by a rotary shaft 6 having a belt and pulley drive connection 7 with a suitable source of power, not shown, there being cross pieces 8 between the upper ends of the standards and a shaft bearing 9 supported by the cross pieces. The nuts are fed from the chute 5 from the distributer and are delivered to the nut cracking machine and from thence, after being cracked, will be dropped from the table into a receptacle, not shown. The distributer acts to present the nuts for cracking in such manner that jamming of the mechanism will be prevented.

The distributer comprises a receptacle 10, in this instance, of cylindrical form, and which is open at its upper side. This receptacle is provided with a central conical portion 11, the base of which is spaced circumferentially from the circular wall of the receptacle, leaving a comparatively narrow and angular space at the bottom of the receptacle.

The conical member 11 is provided with a collar 12 at its upper end, which collar is mounted on the shaft 6 and held securely thereon by set screws 13. The shaft passes through the conical portion 11 and bottom wall of the receptacle 10. The collar 14 is supported on the shaft by set screws 15 and engages and supports the under side of the receptacle. Extending downwardly from the cross pieces 8 are rods 16, which rods extend downwardly into the receptacle and terminate adjacent the bottom wall thereof. Small segmental plates 17 are fastened by set screws 18 to the lower ends of these rods. In the bottom wall of the receptacle is a discharge opening 19 having a downwardly directed spout 20. This opening 19 is adapted to be closed by the plates 17 of which latter, in this instance, there are four in number. Mounted just below the frame of the receptacle 19 is an angular plate 21, which plate is supported at the standards 2 and is provided at spaced points thereon with openings 22, substantially equal in size as the openings 19 and arranged so that said spout 20 may register therewith. Extending downwardly from the openings 22 are distributing tubes 23, the lower ends of which are angularly deflected as at 24. The plate 21 is provided with valves 25 which may be manipulated to close the openings 22.

Distributing tubes 24 are adapted to discharge nuts into openings 26 which, in this instance, are of key-stone shape and provided in head portions of plates 27, which plates are supported in superposed spaced relation to the table 1 and by upstanding lugs 28 and fastening means 29. Each plate is substantially square and the table is provided with large openings 30 therein of slightly less diameter than the plates and beneath the openings 26. The openings 26 are beveled on their rear edges as at 31 to facilitate the entrance of the nuts into the openings. The angularly disposed lower ends of the spouts are turned so as to direct the nuts into the openings 26, said openings 26 being arranged at right angles to one another. Immediately below the openings 26 are supporting and movable cracking jaws 32 and 33, which jaws are mounted in a stationary frame 34. The jaw 32 is provided with a serrated gripping surface extending partly beyond certain edges of the openings 26. The movable jaws slide towards and away from the stationary jaws in the plane thereof, and are provided with similar serrated gripping surfaces 37. The two gripping surfaces provide a wedge shaped space between the jaws so that when the movable jaws are moved towards the stationary jaws, an effective cracking of the nuts will be provided. The jaws 33 are provided with outward projections 38 adapted to be engaged to cause the jaws to move inwardly with an effective crushing or cracking of the nut against the jaws 32. There are four sets of jaws arranged each of them, beneath the openings in the plates 27. Mounted on the shaft 6 for rotation with the shaft is a plate or disk 39 adjacent to the periphery of which is an abutment or striker member 40 in the form of an upstanding cylindrical projection. This member is adapted, during rotation of the disk, to operate mechanism for moving the jaws 33 so as to crack the nuts. The operating mechanism, in this instance, comprises an arm 41 pivoted as at 42 on the table 1, at one end, and at its other end having a bifurcation 43 in which is adjustably mounted an extension 44. The extension 44 may be shortened or lengthened by the adjustable fastening means 45, which will increase or decrease the size of the space between the jaws. The extension 44 is adapted to bear against the outer end of the projection 38 on the jaw 33 intermediate of its ends and at its outer end is mounted as at 46 with its rounded portion disposed in the path of the abutment member 40, whereby, when said member strikes the rounded end, the lever provided by the arms 41 and 42, will move so as to force the jaw 33 towards the jaw 32. It will thus be seen that the four cracking devices will operate one after the other and continuously as the disk 39 rotates and the member 40 contacts with the equi-distantly spaced extensions 44. The jaws 33 are normally held in inoperative position by retractile springs 47. These springs 47 are attached at certain ends as at 48 to the frame 34 and at their other ends to certain ends of levers 49. The levers 49 are pivoted as at 50 intermediate of their ends and at their ends engage projections 51 of the extension 38 of the jaws 33. The spring acts on the lever 49 so that the levers are moved to hold the movable jaws in retracted position and to return them to such position after an operation of the movable jaws. Due to this arrangement the arms 41 and 44 are moved to normal position as well as the jaws.

As a means for supporting the nuts between the jaws, there is provided a trap door 52 which is pivoted at one end as at 53 to the frame of each of the cracking mechanisms. The door 52 is adjustably supported by an adjusting pin 54 vertically adjustably mounted in a collar 55 carried by an operating lever 56. Set screws 57 provide for holding the pin 54 in adjusted position. Preferably the pin is adjusted so that the door is normally downwardly inclined from its pivot point. A receptacle having an inclined bottom is thus provided between the jaws and the nuts will roll into engagement of the jaws regardless of the size and shape of the nuts, due to the inclined door. The door may be adjusted as required, dependent on the sizes and the kinds of nuts being cracked. The lever 56 is substantially L-shaped and adjacent the end thereof opposite to that at which the sleeve 55 is carried, said lever is journaled in a bearing 59 on the frame 34. The end of the lever projecting through the bearing has a crank arm 60 attached thereto by means of a set screw 61. This crank arm has one of its angular portions 62 in the form of a roller, arranged to engage under the plate or disk 39. This engagement of the roller 62 with the plate maintains the lever 56 in such position that the door 52 will be held in the position in which it is adjusted during the rotation of the disk 39 except when the roller 62 is under the recess 63 provided adjacent the periphery of the disk 39 on the other side thereof. The recess 63 is arranged so that the member 62 engages therein immediately following the striking of the lever 46 by the abutment member 40, that is to say, immediately after a cracking operation of the jaws. When the lever member 62 enters the reduced or recessed portion 63, the lever 56 is permitted to rock and the portion carrying the pin 54 trips, permitting the door to swing into open position, by its own weight, and allowing the nut supported by the door to be dropped through the door opening and into a receptacle, not shown, placed beneath the opening.

In the embodiment of the invention shown in the drawings there are four mechanisms for cracking the nuts and therefore each time that the disk 39 makes one revolution four nuts will be cracked and drop from the cracking mechanism.

In the operation of the machine, the nuts having been fed into the receptacle 10 of the distributer mechanism 3 are distributed by the conical center piece 11 and enter the spout 20 through the opening. The opening is of such size that only one nut can enter and be retained in the end of the spout 20 and as the lower end of the spout 20 is but slightly spaced from the angular plate 21, said spout is therefore closed. As the distributer rotates the spout 20 will register with the openings 22. Each time that the spout 20 registers with one of the openings 22, the nut contained in the spout drops through the opening 22 and into the tubes 24. The members 17 on the rods 16 are arranged immediately over the openings 22 and when the registration of the spout 20 with these openings takes place, the opening in the receptacle 10 leading to the spout is closed by the member 17. This prevents jamming of the nuts and regardless of the feed, so that only one nut at a time can pass through the opening in the receptacle and through the distributing means. The member 17 is so shaped that the other nuts being moved during the rotation of the receptacle 10 will not jam between it and the conical member and the cylindrical wall of the receptacle.

The nuts having entered the tube 24 will be discharged into the openings 26 in the plates 27 and be supported in place by the trap doors 52 between the jaws 32 and 33. As the disk 39 is rotated corresponding with the distributer, each time that the member 40 strikes one of the arms 44 in its movement past the arm, the jaw 33 of that particular mechanism is moved forcibly inward and cracks the nut. Following this the rollers 62 enter the recessed portion 63 and permit the lever 56 to rock and drop away from the trap door permitting the trap door to freely open and discharge the nut. This operation is carried on continuously there being with the mechanism shown, four nuts cracked on each revolution of the disk 39. Due to the fact that the operation is carried on without jamming of the nuts, it will be seen that a great quantity of nuts may be expeditiously cracked in a desirable manner without damaging the nuts. The extent of movement of the jaw 33 and the amount of pressure brought to bear on the nuts will be regulated dependent on the size of the nuts and the kind of nuts being cracked. To do this, the arms 44 are moved outwardly and inwardly, relative to the arms 41 to increase or decrease the leverage action. When the arm 44 is shortened the extent of movement of the jaw 33 is lessened and when the arm is lengthened the extent of movement is increased. If desired, by moving the valves 25 inwardly and closing the openings 22, the feed of nuts to one or more of the cracking mechanism devices may be cut off.

Mounted on the frame 1 are adjustable stop members 70 which are adapted to be engaged by the levers 44 to limit the outward movement of the levers and the movement of the jaws 33. To vary the space between the jaws, the stop members 70 are adjustable and will, by this arrangement permit a larger or smaller space as desired, dependent on the nuts, between the jaws. It is necessary to gage the size of this space in order to regulate the movement of the movable jaws to prevent cracking of the nuts to an extent which will damage the meat. After one or two nuts have been cracked and the proper space determined, the adjustment may be set and the operation continued. One of the jaws of the invention has the provision of an inclined door between the jaws and a wedge shaped space provided between the latter. This insures the nuts rolling down into position to engage with the inclined edges of the jaws, regardless of the size of the nuts, and facilitates the cracking operation.

I claim:—

A nut cracking machine comprising a support, a frame mounted on the support, a jaw fixed on said frame, another jaw slidable in said frame towards and away from said jaw, a nut supporting member disposed beneath said jaws, a lever pivoted at one end on the support, an extensible member adjustably connected with the lever and engaging between its ends said movable jaw, spring means normally holding said jaws apart, a revolving member on the frame, an abutment on the revolving member adapted to engage the end of the extensible portion of the lever to rock the lever on rotation of the rotary member and means for tilting the nut supporting member operating following the movement of the slidable jaw into position to crack the nut, which means includes a locking member engaged with the under side of said rotary member, said rotary member having a depression in its under side in which said locking member engages to bring about operation of said means for tilting the nut support.

JOSEPH GALLEAZZI.